Sept. 20, 1938.　　A. B. RYPINSKI　　2,130,399
SHEET METAL SCREW SOCKET
Filed Nov. 24, 1936
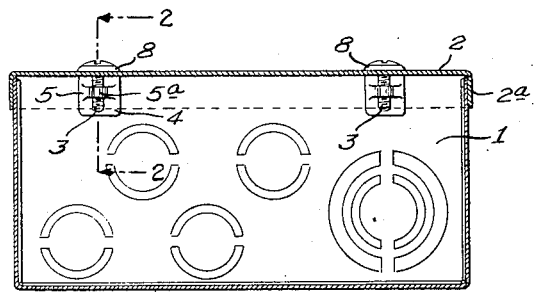
Fig. 1
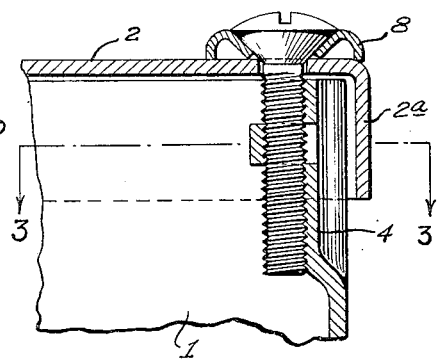
Fig. 2
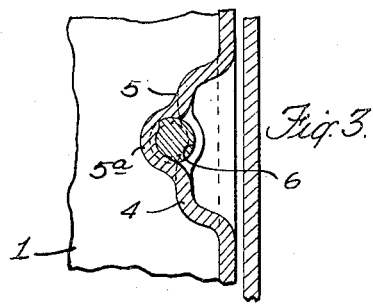
Fig. 3
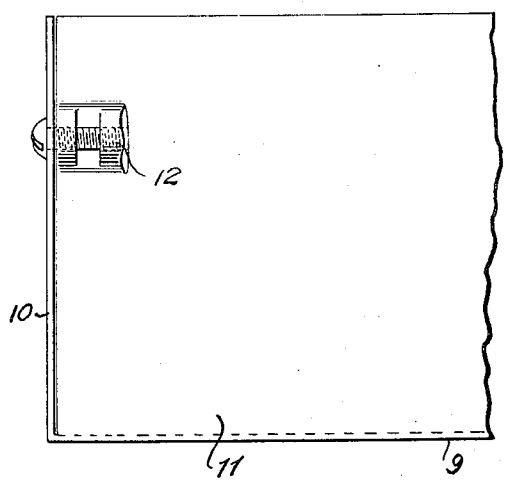
Fig. 4
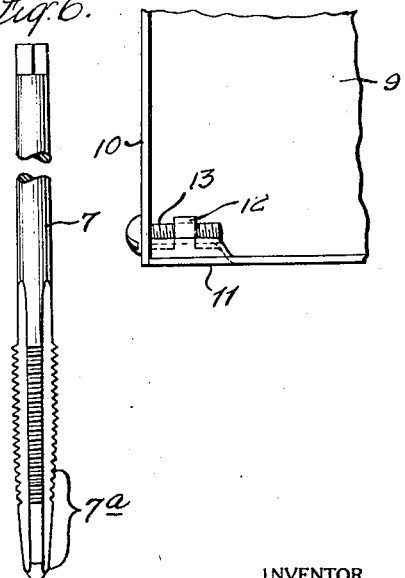
Fig. 5
Fig. 6
INVENTOR
Albert B. Rypinski
BY George T. Gill
ATTORNEYS Patented Sept. 20, 1938

2,130,399

UNITED STATES PATENT OFFICE 2,130,399

SHEET METAL SCREW SOCKET

Albert B. Rypinski, Laurelton, N. Y., assignor to Metropolitan Device Corporation, a corporation of New York Application November 24, 1936, Serial No. 112,497

2 Claims. (Cl. 220—55)

The invention herein disclosed relates to an article made from sheet metal and in particular to the construction of a tapped socket for receiving a machine screw.

Heretofore, in the construction of sheet metal articles, it has been the practice wherever it was necessary to secure two angularly disposed members or sections together by a machine screw, to provide an angularly disposed lug or an angle secured to one of the members. This lug or angle is drilled and tapped to receive the machine screw. For example, in the construction of sheet metal cabinets, and particularly electrical conduit boxes and switch cabinets, it is the common practice to secure several lugs to the side walls, or provide the equivalent thereof by cutting a tongue in the metal which is bent at right angles to the side wall. These lugs are drilled and tapped to receive machine screws that pass through openings in the cover or an intermediate partition, as the case may be, that is to be secured to the side wall.

By this invention, the necessity for these lugs is eliminated. In accordance with the invention there is provided a screw-receiving socket that is formed out of the sheet metal. The sheet metal is lanced and the strap formed by lancing the metal is drawn and shaped to form a semi-cylindrical strap. In addition the sheet metal on either side of the strap is pressed to form a semi-cylindrical groove which with the semi-cylindrical section of the strap forms a socket, the axis of which is parallel to the plane of the sheet metal piece, or it may be inclined thereto. When the socket is tapped it provides a satisfactory socket for a machine screw with sufficient threads of sufficient depth to retain a machine under all ordinary forces exerted by tightening a machine screw.

Two cabinets having such threaded sockets are illustrated in the accompanying drawing in which:

Fig. 1 is a section through a sheet metal box or cabinet for an electrical conduit system, the cover being secured on the box by machine screws;

Fig. 2 is an enlarged, fragmentary section taken on the line 2—2 of Fig. 1;

Fig. 3 is an enlarged, transverse, fragmentary section taken on the line 3—3 of Fig. 2;

Fig. 4 is a fragmentary, side elevation of a corner of another box, one in which one side wall is secured to the adjacent side wall by a machine screw;

Fig. 5 is a fragmentary, plan view of the same, looking into the open end of the box; and Fig. 6 is an elevation of a tap used in threading the machine screw socket.

In Figs. 1 to 3 there is illustrated a sheet metal box 1 with the side walls and bottom stamped from a single piece of sheet metal, the sides being welded together. A cover 2 having lateral depending flanges 2a which overhang the sides of the box is provided for the box. The cover 2 is secured on the box by means of machine screws 3, one of which is illustrated enlarged in Figs. 2 and 3.

Threaded sockets are provided in the side walls of the box to receive the machine screws 3. Each of these threaded sockets is formed out of the material of the side wall in the manner illustrated in Figs. 2 and 3. The socket shown in these figures of the drawing is formed by drawing a portion of the metal of the side wall, adjacent the edge, to form an inwardly extending offset portion or bulge 4. This offset portion is lanced to form a strap 5 united to the offset portion at each end but disconnected along its side edge. The metal of the strap 5 is drawn to form a section 5a of substantially semi-cylindrical configuration extending into the box, the axis of the semi-cylindrical section 5a being parallel to the plane of the side wall and perpendicular to the plane of the cover. A semi-cylindrical depression 6, coaxial with the semi-cylindrical section 5a of the strap, is formed in the offset portion 4 of the side wall. These two semi-cylindrical sections form in effect a cylindrical socket.

In threading this socket to receive a machine screw, a tap 7 such as illustrated in Fig. 6 is used. This tap has a long section 7a between its end and the beginning of the effective threads. The section 7a is of sufficient length to pass through the strap 5 and engage the inner end of the offset portion 4 of the side wall before the effective cutting threads of the tap bite into the metal of the strap. If an ordinary tap is used, it has a tendency to pass through the slot formed by lancing the offset portion 4 as it is opposed by the strap 5 on one side and has no resistance on the other. When however the end of the tap extends below the strap 5 it is held by the offset portion 4 coaxially with the axis of the section 5a of the strap and the depression 6 in the offset portion 4.

The machine screw 3 extends through an opening in the cover that is aligned with the socket formed in the side wall. The threads of the screw engage the threads cut in the strap 5 and the threads cut in the wall of the depression 6 in the offset portion 4. While the walls of the socket are not continuous, nevertheless there are sufficient threads engaging the threads of the screw 3 so that the force exerted by tightening the screw 3 in the ordinary manner, that is, with a hand screw-driver, is resisted and the contact of the threads is sufficient to prevent a stripping of the threads.

The offsetting of the portion 4 serves two purposes. It relieves the tap from cutting except where it is desirable to cut threads and it moves the screw head in from the edge of the cover. In the box illustrated, countersunk finishing washers 8 surrounding the screw 3 are used, but these form no part of the invention.

In Figs. 4 and 5 a corner of a box 9 is illustrated. This box has the bottom and side walls formed from a single piece of sheet metal but the upper ends of adjacent side walls of the box are secured together by machine screws. All of the side walls are similarly secured together in the manner of the side walls 10 and 11 forming the illustrated corner of the box. In the side wall 11, there is formed a threaded socket denoted generally by the numeral 12. This socket is in all respects similar to the socket formed in the box 1 illustrated in Figs. 1 to 3, except that the axis of the socket 12 is perpendicular to the plane of the side wall 10. A machine screw 13 extends through an opening in the side wall 10 that is coaxial with the socket 12 and engages the threads of the socket 12. The wall 10 is shown slightly spaced from the edge of the wall 11 for the purpose of illustration, but when the screw 13 is tightened the wall 10 is firmly clamped against the edge of the wall 11.

It will be apparent to those skilled in the art that by the construction illustrated in the drawing and described above, there is provided a convenient and effective machine screw socket for sheet metal constructions. The socket is readily and inexpensively formed and does not in the manner of a lug extend from the side wall to form an obstruction.

While the invention has been described as a socket for a machine screw it will be apparent that it is equally useful with other fasteners such for example as a stud bolt. It is also obvious that various changes may be made by those skilled in the art in the details of the specific embodiments illustrated in the drawing and described in detail above within the principle and scope of the invention as expressed in the appended claims.

I claim:

1. In a sheet metal cabinet construction having walls of sheet metal, the feature of novelty consisting of a wall of the cabinet having a portion pressed to form an arcuate depression, spaced, parallel slits traversing the arcuate depression and the space between the slits struck out forming an arcuate strap extending from the surface of the wall and forming with the arcuate depression a substantially cylindrical socket, the inner surface of the strap and the arcuate depression on each side of the strap being threaded to receive a machine screw.

2. In a sheet metal cabinet construction having walls of sheet metal, the feature of novelty consisting of a wall of the cabinet having a portion pressed to form an arcuate depression spaced from the plane of the wall, spaced, parallel slits traversing the arcuate depression and the space between the slits struck out forming an arcuate strap which with the arcuate depression forms a substantially cylindrical socket, the inner surface of the strap and a portion of the arcuate depression on each side of the strap being threaded to receive a machine screw.

ALBERT B. RYPINSKI.